March 27, 1962 A. TALMADGE 3,027,012

RECORD RACK

Filed March 18, 1959

INVENTOR.
Arthur Talmadge
BY
Olson, Mecklenburger, von Holst, Pendleton, & Neuman. Attys.

3,027,012
Patented Mar. 27, 1962

3,027,012
RECORD RACK

Arthur Talmadge, 1343 Westmoor Trail, Winnetka, Ill.

Filed Mar. 18, 1959, Ser. No. 800,228
1 Claim. (Cl. 211—40)

This invention relates to a novel record rack construction and more particularly pertains to a record rack in which records may be displayed in fixed non-rotatable position in a vertical plane by means of unique spindle members passing through the central openings thereof.

The desired display of phonograph records is oftentimes difficult inasmuch as no means has heretofore been devised for efficiently displaying a plurality of records in full view in a limited area without substantial risk of record damage. The records should obviously be displayed so that the title and/or other pertinent information found thereon may be quickly and easily read, and in addition the records should not be damaged as a result of remaining in their display position or as a result of contact between adjacent records, or excessive handling.

Phonograph records may be classified with that merchandise commonly the subject of "impulse buying." A shopper browsing through records in a store may be induced to buy merely by viewing the title of the song which he may have heard or by noting a particular orchestra or vocalist comprising a favorite of the prospective purchaser.

Obviously if the records may be viewed with a minimum of effort and searching the potential purchaser will be in a much better mood for buying. This ease of purchase is to be contrasted with the plight of a prospective purchaser who must laboriously examine clumsily arranged stacks of records which soon become shabby in appearance after a minimum number of examinations by the purchasing public.

It is an object of this invention therefore to provide a novel record rack construction in which the record information is clearly on display in full view with the record label in a proper upright position for reading.

It is another object of this invention to provide a novel rack construction in which there is substantially no danger of damaging the records.

It is still another object of the invention to provide a novel record display system in which the records and racks therefore may be coded to insure any desired classification according to music type, composer, artist, record manufacturer, and the like.

It is further object of this invention to provide a novel rack construction in which the components thereof are inexpensive to manufacture and also readily assembled into the finished rack construction.

The above and other objects of this invention will become more apparent from the following detailed description when read in the light of the accompanying drawing and appended claims.

In one embodiment of the record rack an elongate strip of wood or other suitable material has spindle members normally projecting from one surface thereof. The spindle members are of approximately the same cross-sectional area as the central apertures in 45 r.p.m. records with the exception that a projecting longitudinal rib portion is formed on a portion of each spindle periphery so that each spindle circumference is non-circular. The rib extends along the length of said spindle members parallel to the longitudinal axes thereof. The rib may have any one of a plurality of configurations. The function of the spindles is to interlock with records having corresponding central openings thereby enabling such records to be disposed in a vertical plane without any possibility of rotating while mounted on the spindles. Thus the pertinent information on the record label will always be maintained in a suitable position for easy reading. The records will be undamaged and unhandled while on the rack, and their cooperation with normal phonograph components will be unaffected, as will hereinafter be explained in greater detail.

For a more complete understanding of this invention reference will now be made to the drawings wherein.

Figures 1, 2, 3, 4, 5, 6:
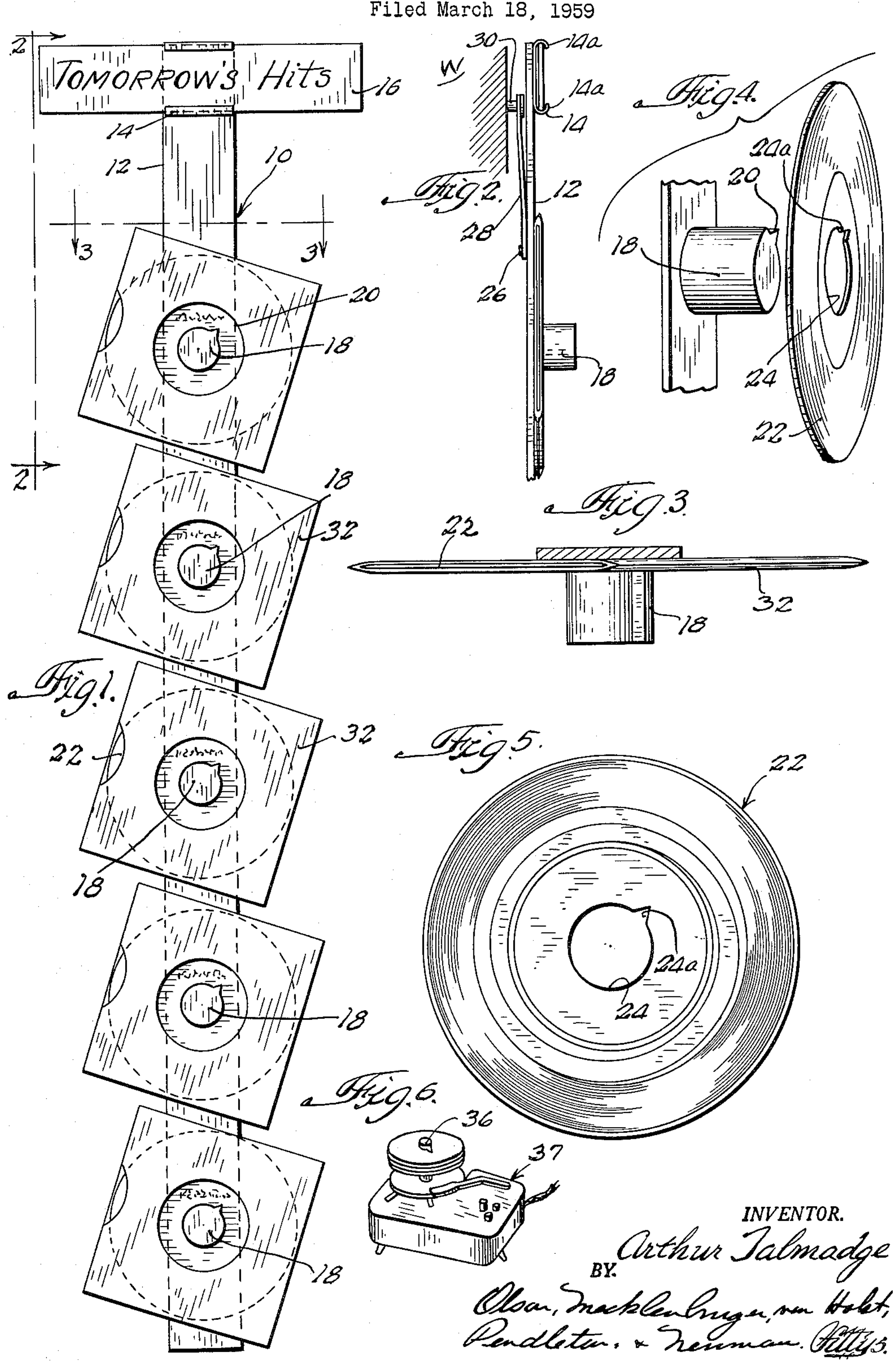
FIGURE 1 is a front elevational view of one embodiment of this invention illustrated with records attached thereto in normal position.
FIG. 2 is a fragmentary side elevational view taken along line 2—2 of FIG. 1.
FIG. 3 is a fragmentary elevational view partly in section taken along line 3—3 of FIG. 1; and illustrated on an enlarged scale.
FIG. 4 is a fragmentary exploded view illustrating the relative disposition between a record and a spindle of the rack prior to interlocking engagement.
FIG. 5 is a plan view of a phonograph record apertured for interlocking engagement with the illustrated rack.
FIG. 6 is a perspective view of one phonograph adapted to receive records processed for engagement with the rack of this invention.

Referring now more particularly to FIG. 1, one embodiment 10 of the rack provided by this invention is illustrated comprising an elongate strip-like member or slat 12 which may be of wood, plastic, metal, or other suitable material and having a channel-like member 14 secured to the upper end portion thereof. As will be more clearly seen from FIG. 2, channel-like member 14 comprises a holder having opposed curved edge portions 14*a* which are adapted to engage a sign 16 which may be of stiff cardboard or the like, and retain the same in fixed position at the upper portion of elongate member 12.

Projecting in spaced relationship from one surface of member 12 is a plurality of spindles 18 which, as is more clearly seen from FIG. 2, project at substantially right angles from the surface of member 12. Spindles 18 are cylindrical and of substantially circular cross-sectional configuration with the exception of a projecting rib 20 which, as will be noted more clearly from FIG. 3, extends along the length of each spindle. The ribs 20 are of substantially triangular cross-sectional configuration; however, that specific configuration is not critical, as will be quite apparent from the following. What is important is the forming of a spindle member having a nonuniform or noncircular cross-sectional configuration.

It is the purpose of each spindle member to interlockingly engage with a phonograph record, such as illustrated records 22, having a central opening or aperture which is of substantially the same area and configuration as the cross-section of the spindles 18. Records 22 have large central openings as typified by the currently popular 45 r.p.m. records and, when disposed on the spindles of the holder 10, assume a fixed non-rotatable position thereon.

Each spindle 18 is glued or otherwise securely affixed to elongate member 12 so that there is no relative movement between spindles and the member 12 on which they are anchored. Accordingly, since aperture 24 of each record 22 is of the same configuration as the spindle cross-section, there is no chance of rotary movement taking place between the record and the spindle. It is obvious that rib 20 and triangular recess portion 24*a* of each record opening (see FIG. 4) prevents relative rotary movement between the spindle and the record engaged thereby. The opening 24 having notch 24*a* may be readily formed in the manner usually employed in forming central openings of records and requires no additional processing steps or elaborate additional equipment.

In the normal position of assembly the spindles 18 should have the rib portions 20 so disposed that the printed material identifying the title, orchestra, as well as other information, is in an erect position or nearly so in order that a person inspecting the record rack may readily examine the records and obtain the desired information.

From FIG. 2 it will be noted that spindle members 18 may project from one surface of elongate member 12 and have a hook member 26 secured by screws or other equivalent means to the slat for purposes of engaging a securing means such as nail 30 whereby the entire rack may be supported by a wall such as the wall W of FIG. 2. It is apparent that the rack 10 may depend from supporting wires whereby spindle members 18 may project from both surfaces of the slat 12 and accordingly, the records may be displayed on both sides of the slat.

Even though the central portions of record members are usually of greater thickness than the grooved portions thereof so that records may be stacked on the spindle 18 without damaging the grooved portions in any way, it may sometimes be desirable to display the records in their original wrapper such as wrappers 32 (illustrated in FIGS. 1, 2, and 3) to further protect the grooved portions and prevent possible abrasion with the slat member 12 supporting the same. A record having no wrapper thereon (such as record 22 of FIGS. 4 and 5) may also be displayed on the rack and, because of the aforementioned thickness of the central apertured portion and the restriction against relative rotation provided by ribs 20, abrasion between the adjacent record grooves and between the record and the supporting slat will still be avoided.

The notch formed in the record and the corresponding projection of the rack spindles should be of such size that the proper engagement of each record with a phonograph spindle (such as spindle 36 of player 37 of FIG. 6) will not be altered. The phonograph spindle 36 is substantially cylindrical, and the notch **24*a* should be so selected that the central circular aperture of the record closely engages the spindle without excess freedom which would result in eccentric motion and objectionable audio effects. Thus the portion of the central circular aperture 24 of record 22 that is removed to provide notch 24*a*** should be small.

Obviously, the rack 10 will be of greatly utility in displaying new records as they issue. The rack 10 enables a prospective buyer to examine at a glance the titles and other pertinent information on the records in a ready and facile manner without handling, or in any way damaging the records.

One important advantage of the instant system including the notched records 22 and the correspondingly ribbed rack 10 is the ability of merchandisers to easily maintain a predetermined classification system through the use of various shapes in the ribs and notches. Thus, classification by music type, artist, composer, or manufacturer can be insured through a coded system of notches. For example, the triangular notch **24*a* may represent current hit tunes, while a square notch indicates classics, an arcuate notch indicates musical comedies, and some other irregular notch indicates march tunes. Thus, a plurality of racks in side by side relationship can be employed to display records of different types or of various manufacturers without the danger of intermingling of the various categories by customers. Each record will be adapted for a particular display rack only. Moreover, a particular company distributing the racks can assure that the records being displayed on such rack are only those sold by the company distributing the particular rack inasmuch as another record will not be engageable with the spindles 18** because of the unique projection formed thereon. Thus, a company employing such rack for use with its own records is assured that no other records will be displayed thereon.

It is apparent that the rack construction of this invention is inexpensive, has an indefinite life, and results in no damage whatsoever to the records displayed thereon in the normal course of use.

In view of the apparent changes which may be made in the above described rack construction which will still be within the scope of the inventive concepts disclosed, this invention is to be limited only by the appended claim.

I claim:

In a record rack display assembly the combination comprising records having central openings adapted to engage first record-player spindles of circular cross section in the normal course of use thereof, each of said central openings having a notch formed in a peripheral portion thereof, an elongate base comprising a relatively narrow strip, means for suspending said strip in a substantially vertical plane, a plurality of display spindles arranged longitudinally on and projecting at substantially right angles from said elongate base, the longitudinal axes of each of said spindles being substantially horizontally disposed in the normal position of rack use and having cross-sectional configurations similar to the configuration of said record central openings whereby said records mounted on said spindles are maintained in a supported non-rotating position thereon, said notches being of small magnitude whereby said records may engage said first record-player spindles with substantially no relative lateral movement between said circular spindles and records.

References Cited in the file of this patent

UNITED STATES PATENTS

| | | |
|---|---|---|
| 504,916 | Frankel | Sept. 12, 1893 |
| 870,961 | Hoffman | Nov. 12, 1907 |
| 901,901 | Hornich | Oct. 20, 1908 |
| 915,786 | Moyer | Mar. 23, 1909 |
| 1,527,386 | Barnard | Feb. 24, 1925 |
| 1,598,277 | Heppe | Aug. 31, 1926 |
| 1,712,473 | McWethy | May 7, 1929 |
| 1,821,851 | Schwarzhaupt | Sept. 1, 1931 |
| 2,200,866 | Thompson | May 14, 1940 |
| 2,534,067 | Rubin | Dec. 12, 1950 |
| 2,670,261 | Mueller | Feb. 23, 1954 |

FOREIGN PATENTS

| | | |
|---|---|---|
| 407,484 | France | Jan. 4, 1910 |